United States Patent Office 3,085,886
Patented Apr. 16, 1963

3,085,886
METHOD OF PREPARING SILICON NITRIDE FOAM MATERIAL
Max F. Grandey, Hamilton, Ohio, and John Frederick Kulp, Malvern, Pa., assignors to General Electric Company, a corporation of New York
No Drawing. Filed Dec. 14, 1960, Ser. No. 75,672
5 Claims. (Cl. 106—41)

This invention relates to foamed material, and more particularly, to a method for making silicon nitride foam.

The potential value of refractory thermal insulators for use in high temperature operating, power producing apparatus such as gas turbine engines, has been of interest to designers. The development of a material possessing properties suitable for such use is characterized by (1) low density, (2) refractory qualities in an oxidizing atmosphere, (3) good thermal shock resistance, (4) resistance to erosion, (5) mechanical integrity, (6) good insulating qualities, and (7) resistance to the combustion product of the fuel being used.

It is the principal object of this invention to provide a method for making a refractory material useful as a thermal insulator operable at about 3000° F. in an oxidizing, erosive atmosphere and having good thermal shock resistance, mechanical integrity and good insulating qualities.

Another object of this invention is to provide a method for making a foamed silicon nitride material from a silicon nitride powder strongly bonded together.

These and other objects and advantages will be better understood from the following detailed description and succeeding examples which are meant to be illustrations of rather than limitations on the scope of this invention.

Briefly stated, this invention in one form comprises, in a method of making silicon nitride foam from a mixture comprising silicon nitride powder and a silicone resin, the steps of heating the silicon nitride-silicone resin mixture above the decomposition temperature of the silicone resin in a nitriding atmosphere to produce a bond between the silicon nitride powder and the product of the silicone resin decomposition.

Many methods have been reported for making foamed or porous materials. One method reported in 2,917,384, Grandey, includes mixing a metallic powder with a silicone resin, foaming the mixture and then heat treating the resulting foamed article in a reducing atmosphere to produce an unoxidized metal foam material.

It was unexpectedly discovered that the substitution of a nitriding atmosphere, such as dry nitrogen, for the reducing atmosphere used in the above described method or the inert atmospheres or vacuum described in other processes, produces a strong bond which is believed to be a silicon to silicon or silicon to silicon nitride bond between particles of $Si_3N_4$ in the presence of a silicone resin above the decomposition temperature of the silicone resin. It is believed that at least a portion of the product of decomposition of the silicone resin in a nitriding atmosphere forms silicon nitride and bonds with the silicone nitride powder. When these ingredients are initially in the form of a foam, the practice of the method of this invention would serve to bond the silicon nitride powder into a continuous foamed silicone nitride material.

In the method of this invention, it has been found that the preferred final processing temperature in a dry nitrogen atmosphere is within the range of 1900–2150° F. It is preferred that nitrogen be used at a flow rate of 14–18 liters per hour, although it is to be recognized that the minimum nitriding atmosphere or nitrogen required is that sufficient to nitride the silicon in the silicone decomposition product and that as dry a nitrogen as possible be used to inhibit formation of $SiO_2$ in favor of the formation of $Si_3N_4$.

*Example I*

A mixture was made, by weight, of 66% $Si_3N_4$ (about −325 mesh), 33% of a foamable methyl phenyl silane resin sold by the Dow Corning Corporation as silicone resin DC 544 and 1% of a bridged cyanidine foaming agent as described in 2,917,384, Grandey. 303 grams of this mixture were placed in a rectangular confining mold of 55.6 cubic inches. The mold and contents were heated at 450° F. for 1 hour in a forced air convection oven to foam the silicone resin and silicon nitride powder into a foamed resin-powder material. The foamed material was placed in a retort the air atmosphere of which was replaced by dry nitrogen. The retort was then placed in a furnace at 1000° F. and the furnace temperature was increased from 1000° F. to 2040° F. over a period of 8 hours. The nitriding atmosphere was nitrogen at a flow rate of 16 liters per hour. The material was held at 2040° F. for 2 hours after which it was cooled to below red heat and then removed from the retort. The resulting material was a silicon nitride foam of continuous foam structure and uniform porosity. Its density was 0.051 pound per cubic inch.

*Example II*

A mixture was made of 53.2 weight percent $Si_3N_4$, 42.5 weight percent silicone resin DC 544 and 4.3 weight percent foaming agent. 490 grams of this mixture was placed in a 13 cubic inch confining mold and foamed at 410° F. for one hour in a forced convection air oven. The additional processing of Example I was repeated through a temperature of 2000° F. The result was the same quality material as that of Example I with a density of 0.1053 pound per cubic inch.

*Example III*

375 grams of the mixture of Example I was placed in a 21.2 cubic inch confining mold and the process of Example I was repeated. Density of material resulting was 0.038 pound per cubic inch.

It is possible by the adjustment of mold size and amount of ingredients included therein to adjust the density of a silicone nitride foam made by the method of this invention to that desired by designers.

*Example IV*

A mixture was made of 56 weight percent $Si_3N_4$ (−200 mesh) with 41 weight percent silicone resin (−325 mesh) and 3 weight percent foaming agent.

After thoroughly mixing and screening to insure freedom from lumps and aggregates, the mixture was placed in a mold which had been preheated to about 430° F. The mold thus filled was placed in a press, the platens of which had been preheated to about 430° F. and sufficient pressure was applied to prevent leakage during the foaming process. The material was held in the mold to foam and partially cure the mixture for approximately 90 minutes. The material thus formed was then placed in a nitrogen atmosphere retort and heated slowly to 2000° F. in pure dry nitrogen. It has been shown that a heating rate of 50° F. per hour from the initial retort temperature to the final heating temperature provides the best product. Substantially faster heating can yield specimens which have cracked or checked surfaces and, in severe cases, may be seriously cracked throughout. Therefore it is preferred that a heating rate of 50–75° F. per hour be used.

After removal from the retort at temperatures below red heat, the material thus formed contains elemental carbon from the silicone resin. This may be removed by exposure, under oxidizing conditions, such as at 1500° F. The time required for this operation is dependent on both specimen thickness and density, the thicker or the more dense material requiring longer exposure times to remove carbon.

The material formed by the method of this invention, typified by the above examples is characterized by a maximum operating temperature in excess of 3000° F. It has good thermal shock resistance as evidenced by cycling from about 3000° F. to about 850° F. for 50 cycles without failure and from about 2500° F. to about 850° F. for 2500 cycles before failure. The co-efficient of linear expansion from about room temperature to about 2100° F. was 1.8 in./in./° F. and the co-efficient of thermal conductivity was about 10 B.t.u./ft.²/hr./° F./in.

Thus, through the discovery that a complex silicon-silicon or silicon-silicon nitride bond can be created between powders of $Si_3N_4$ which were arranged in the foam by decomposing a silicone resin in the presence of a nitriding atmosphere, a material has been provided which has the necessary and unusual characteristics for use as a thermal insulator.

Although this invention has been described in connection with specific examples, it will be recognized by those skilled in the art of the modifications and variations which are capable of this invention within its broad scope.

What is claimed is:

1. In a method of making a silicon nitride foam from a mixture comprising silicon nitride powder and a silicone resin, the steps of heating the mixture above the decomposition temperature of the silicone resin in a nitriding atmosphere to produce a bond between the silicon nitride powder and the product of the silicone resin decomposition.

2. In a method of making a silicon nitride foam from a mixture comprising silicon nitride powder and a silicone resin, the steps of heating a foamed mixture of silicon nitride powder and a silicone resin at a temperature between 1900–2150° F. in a nitriding atmosphere.

3. In a method of making a silicon nitride foam from a mixture of silicon nitride powder in a silicone resin, the steps of heating a foamed mixture of silicone nitride powder and a silicone resin from about 1000° F. to between 1900–2150° F. in a dry nitrogen atmosphere at the maximum rate of about 75° F. per hour.

4. The method of making a silicon nitride foam comprising the steps of mixing silicon nitride powder with a foamable silicone resin, foaming the mixture, placing the foamed mixture in a dry nitrogen atmosphere at about 1000° F., increasing the temperature at the rate of 50–75° F. per hour to about 2000° F., holding the temperature of the material at about 2000° F. to allow formation of silicon nitride from the decomposition product of the silicone resin and then cooling.

5. The method of claim 3 in which the nitrogen flow rate is between 14–18 liters per hour.

References Cited in the file of this patent

UNITED STATES PATENTS

| | | |
|---|---|---|
| 2,636,828 | Nicholson | Apr. 28, 1953 |
| 2,750,268 | Erasmus | June 12, 1956 |
| 2,917,384 | Grandey | Dec. 15, 1959 |